2,746,887
LUBRICATED FIBER STRAND
John B. O'Neil, Duxbury, Mass., assignor to Plymouth Cordage Company, Plymouth, Mass., a corporation of Massachusetts No Drawing. Application June 17, 1953,
Serial No. 362,387

7 Claims. (Cl. 117—139.5)

The present invention relates to fiber strands, particularly strands comprising fibers of vegetable origin, and consists in a novel lubricant that enhances significantly the softness, durability and the tensile strength of the strand, and facilitates the processing of the fibers during the formation of the strand. In cordage products incorporating this invention an additional advantage is the reduction or elimination of the squeak or creak emitted by a rope when flexed or loaded at high humidity.

In the manufacture of fiber strands, particularly cordage, it is general practice to treat the fibers with a lubricant during their processing to improve their resistance to moisture and to lubricate them that they may slide or slip relative to one another and distribute the load more or less evenly among them. Compositions useful as lubricants generally include an oily or greasy material that readily penetrates the fibers, and, to provide lubrication at the fiber surfaces, a less penetrating material, such as wool grease, is frequently added. The present invention is directed particularly to the lubrication of the fibers at their surfaces.

It has now been found that far superior results with respect to the ease of processing and to the physical characteristics of lubricated fiber strands, such as cordage, are obtained by the use in more or less ordinary and typical lubricants of a small percentage of an organophilic clay, in addition to or in place of the less penetrating materials previously used, e. g. wool grease.

Organophilic clays that may be used in this invention include in general base-exchange clays that have been treated with an organic surface active agent to convert their normally hydrophilic properties to organophilic. When so treated the clays are readily dispersed in the organic liquids with which fibers are normally treated during processing, such liquids being generally known in the art as "textile lubricants" and being in general oils of low volatility that readily penetrate the fibers, for instance, naphtha, tallows, naphthenic oil, aromatic oils, paraffinic oils and synthetic oils such as polyalkylene oxide ether oils and silicone oils.

Preferably the base-exchange clays are those originally exhibiting a base-exchange capacity of at least about 25 milliequivalents of exchangeable base per 100 grams of clay and in which the cation is more or less readily replaced, including the montmorillonites viz. sodium, potassium, lithium or other bentonites; magnesium bentonite (sometimes called hectorite), saponite, nontronite and attapulgite.

In rendering a clay of this type organophilic, it is treated with an organic surface active agent reactive with the clay to form on the ultimate clay particles a surface coating which is readily wetted by organic liquids including the lubricant vehicle with which the fibers are to be treated. The clay may be combined with the surface active agent prior to its incorporation into the lubricant vehicle, or the clay and the surface active agent may be combined in the presence of the vehicle, there to combine and facilitate dispersion of the clay in the vehicle.

The preferred surface active agents are those compounds commonly known as "onium" compounds, examples of which are organic amines and quaternary ammonium bases and their salts. These compounds contain an organic base, referred to herein as an "onium" base, which is cationic in character. By treating a base exchange clay with an onium compound, the onium base replaces the exchangeable cations of the clay, and imparts a definite organophilic and hydrophobic character to the clay. Organophilic onium base clays in general are described in U. S. Patent No. 2,531,427 and in U. S. Patent No. 2,531,440, to which reference is made for a more complete description of onium base clays and of the methods of preparing them.

For the purposes of the present invention the clay should be rendered sufficiently organophilic to be readily dispersed in the lubricant vehicle, and adsorptive thereof, that is to say that the treated clay should show a pronounced swelling in the lubricant vehicle or otherwise demonstrate a high adsorptive capacity for it. Fundamentally, the surface of the clay should be provided with a coating of extent and nature to provide this affinity for the lubricant vehicle, and inasmuch as the various types of base exchange clays possess differing exchange capacities and physical structures, the optimum amount and nature of the onium compound required to condition a specific clay for a specific lubricant vehicle necessarily depends on the nature of the clay and on the nature of the lubricant vehicle with which it is to be used. It is generally advantageous to place the clay in combination with the onium base to the extent of at least 10% and preferably in excess of about 70% of its exchange capacity, and to select an onium base having a molecular surface sufficiently large to provide substantial coverage of the clay surface. Thus clays having low base exchange capacity generally require onium bases having a greater number of carbon atoms than are required of onium bases for treating clays of high exchange capacity, and greater coverage of the clay surface is required for highly non-polar vehicles than for less non-polar ones.

With respect to bentonite, which has an exchange capacity of about 100 milliequivalents per 100 grams, satisfactory results may be obtained by treating the bentonite with a base having a molecular area of at least about 70 square angstrom units or a linear dimension of at least 14 angstrom units, for instance, primary amine salts having at least 10 carbon atoms, but when using a highly non-polar organic vehicle the best results have been attained by using a bentonite that has been treated with a quaternary ammonium salt having more than about 30 carbon atoms.

The interdependence of the organophilic nature of the treated clay on the type and amount of onium compound used in treating the clay is discussed at greater length in Jordan, J. W., Organophilic Bentonites I: J. Phys. & Colloid Chem. 53, 294–306 (1949), and in Jordan, J. W., Hook, B. J. and Finlayson, C. M., Organophilic Bentonites II: J. Phys. & Colloid Chem. 54, 1196–1208 (1950). It will be understood that in rendering a particular base exchange clay of optimal affinity for a particular lubricant vehicle, a certain degree of experimentation not of an inventative nature and in accordance with the principles outlined above is contemplated, and that the present invention is not limited to particular clay-surface active reagent combinations but is rather directed to the combination of a lubricant vehicle and an organophilic clay in or for use in fiber strands.

In producing fiber strands in accordance with this invention the organophilic clay, or untreated clay and a surface active agent to render it organophilic, are combined in the vehicle in an amount insufficient to cause gelling of the vehicle. Improved results are had with as little as about 0.5% organophilic clay, especially when the clay is highly organophilic, but it is preferred to incorporate between about one and eight per cent clay based on the total weight of lubricant. The lubricant is then applied to the fibers preferably as a free flowing liquid in the customary manner, conveniently by spraying it on the fibers during the numerous successive drawing and doubling operations by which the roping is formed preliminary to spinning the fibers into yarn. Alternately the lubricant may be applied to the yarn or to the finished product. The efficacy of the lubricant of this invention is believed due to the retention of the clay particles on the fiber surfaces, with a part of the lubricant vehicle adsorbed on the particles, and the remainder soaked into the body of the fibers.

The following examples describe in detail typical and representative embodiments of this invention, and are presented as illustrative thereof.

*Example I*

To 98 parts by weight of cordage oil, a naphthenic base mineral oil having a viscosity of 100 SSU at 100° F., heated to about 150° F. were added slowly 2 parts by weight of Bentone 34 (a Wyoming bentonite treated with tetra alkyl quaternary ammonium salt, having between 30 and 40 carbon atoms with vigorous agitation by a power mixer. Agitation was continued for about 15 minutes, and the mixture was then sprayed on manila fibers to the extent of 15 per cent of the weight thereof during the drawing and doubling operations, and the fibers were then processed into rope in the conventional manner.

*Example II*

| | Parts by weight |
|---|---|
| Cordage oil | 91.0 |
| Bentone 34 | 3 |
| Copper 8-quinolinolate | 6 |

The cordage oil was heated to about 150° F. and then agitated vigorously while the Bentone 34 was added slowly and dispersed therein. When dispersion was complete the copper 8-quinolinolate was added and mixed thoroughly therein. The lubricant mixture was then applied to cordage fibers in the customary manner.

*Example III*

| | Parts by weight |
|---|---|
| Tallow | 93.5 |
| Bentone —34 | 6.5 |

The tallow was melted and agitated violently while the Bentone 34 was added and dispersed therein. The lubricant was applied to jute fibers in the manufacture of square braided packing.

*Example IV*

| | Parts by weight |
|---|---|
| Cordage oil | 97.7 |
| Attapulgite (Florida-Georgia type) | 1.5 |
| Arquad 2 HT, a surface active reagent described as a tetra alkyl quaternary ammonium salt having between about 30–40 carbon atoms | 0.8 |

The cordage oil was heated to 200° F. and the surface active reagent was added. The mixture was then agitated violently while the attapulgite was added, and agitation was continued until a uniform dispersion was produced. The lubricant was then added to cordage fibers in the manufacture of rope.

The cordage products of each of the foregoing examples was superior to cordage lubricated by lubricants in which the organophilic clay was omitted, or in which wool grease was incorporated in place of the clay. In particular, a tensile strength increase of as much as 10% may be attributed to the presence of the organophilic clay, as well as an increase in the flex-abrasion resistance of as much as 85%. A further advantage resultant from the incorporation of an organophilic clay in cordage is the substantial elimination of squeak when the rope is loaded or flexed, even at relative humidities of 80–90%.

In the formulation of Example II, which includes copper 8-quinolinolate as a preservative, the organophilic clay acted as an adsorbent for the preservative, and improved the resistance of the cordage to biological attack and reduced its tendency to discolor. Other well known copper or zinc base preservatives may also be incorporated in place of or in addition to copper 8-quinolinolate with equally satisfactory results.

Having thus disclosed my invention, I claim and desire to secure by Letters Patent:

1. A lubricated fiber strand comprising a plurality of oriented fibers of vegetable origin and a lubricating medium for said fibers, said lubricating medium comprising an organic textile lubricant and an organophilic clay swellable therein, with the clay comprising between about 0.5 and 8% by weight of said medium and being situated at the fiber surfaces, part of the said textile lubricant being adsorbed by the clay and part being soaked into the body of the fibers.

2. A lubricated fiber strand comprising a plurality of oriented fibers of vegetable origin and a lubricating medium for said fibers, said lubricating medium comprising an organic textile lubricant and an organophilic clay consisting essentially of a base exchange clay reacted with an onium base, with the organophilic clay comprising between about 0.5 and 8.0% by weight of said medium and being situated at the fiber surfaces, part of the said textile lubricant being adsorbed by the clay and part being soaked into the body of the fibers.

3. A lubricated fiber strand comprising a plurality of oriented fibers of vegetable origin, and a lubricating medium for said fibers, said lubricating medium comprising an organic textile lubricant and an organophilic clay consisting essentially of a base exchange clay having a base exchange capacity in excess of 25 milliequivalents per 100 grams in base exchange relation to at least 10% of its exchange capacity with an onium base having at least 10 carbon atoms, with the organophilic clay comprising between about 0.5 and 8% by weight of said medium and being situated at the fiber surfaces, part of said textile lubricant being absorbed by the clay and part being soaked into the body of the fibers.

4. The strand defined by claim 3 wherein the base exchange clay is material selected from the group consisting of bentonite, saponite, nontronite and attapulgite.

5. The strand defined by claim 4 wherein the base exchange clay is bentonite.

6. The strand defined by claim 3 wherein the onium base is a quaternary ammonium base having between 30 and 40 carbon atoms.

7. A lubricated fiber strand comprising a plurality of oriented fibers of vegetable origin and a lubricating medium for said fibers, said lubricating medium comprising an organic textile lubricant, preservative material selected from the group consisting of copper and zinc base preservatives, and an organophilic clay swellable therein, with the clay comprising between about 0.5 and 8% by weight of said medium and being situated at the fiber surfaces, part of the said textile lubricant being adsorbed by the clay and part being soaked into the body of the fibers.

References Cited in the file of this patent

UNITED STATES PATENTS

| | | |
|---|---|---|
| Re. 15,543 | Boileau | Feb. 20, 1923 |
| 255,040 | Skinner | Mar. 14, 1882 |
| 1,550,396 | Smith | Aug. 18, 1925 |
| 1,594,830 | Gray et al. | Aug. 3, 1926 |
| 1,725,829 | Ryley et al. | Aug. 27, 1929 |
| 2,028,157 | Hodson | Jan. 21, 1936 |
| 2,344,671 | Bertsch | Mar. 21, 1944 |
| 2,404,240 | MacLaurin | July 16, 1946 |
| 2,531,440 | Jordan | Nov. 28, 1950 |
| 2,628,197 | Killingsworth | Feb. 10, 1953 |
| 2,662,057 | McCarthy | Dec. 8, 1953 |
| 2,668,145 | Ronay | Feb. 2, 1954 |